May 7, 1963   W. D. HOFER   3,088,265
PICKUP ATTACHMENT FOR HARVESTERS AND BALERS
Filed Jan. 2, 1962
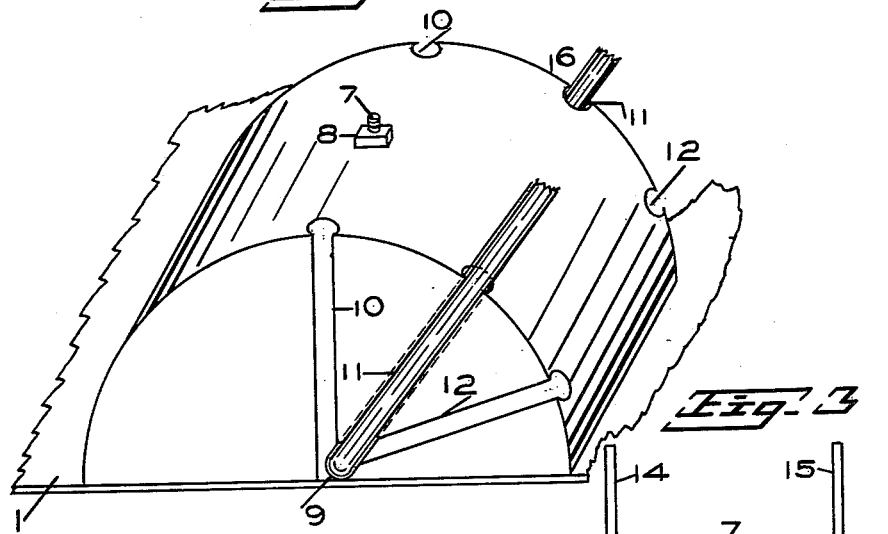
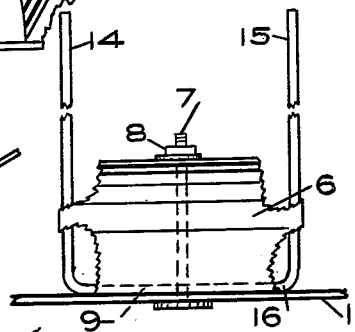
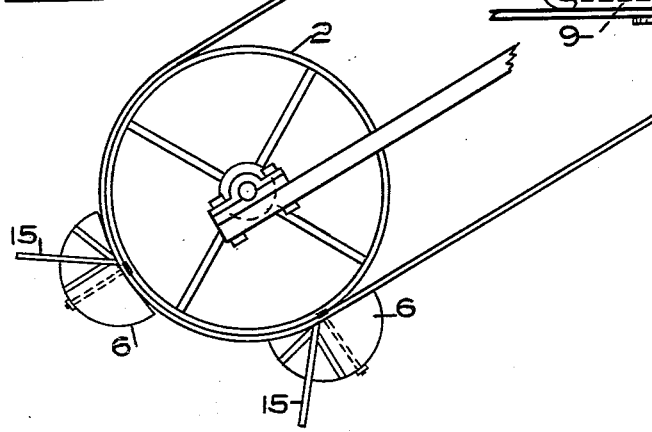

3,088,265
PICKUP ATTACHMENT FOR HARVESTERS
AND BALERS
Walter David Hofer, Brocket, Alberta, Canada
Filed Jan. 2, 1962, Ser. No. 163,718
2 Claims. (Cl. 56—364)

This invention relates to pickup attachments for use on grain harvesters or hay balers, having particular reference to an adjustable mounting for pickup teeth to be used on either a belt type pickup, such as shown in United States Patent No. 2,253,797, granted to Edward G. Melroe, August 26, 1941, or the drum type pickup, such as in United States Patent No. 2,378,107, granted to Stanley D. Russell, June 12, 1945.

In grain pickups of this character using teeth attached on a drum or belt the teeth become bent or damaged and have to be replaced, which in most cases is difficult.

The present device is designed to overcome these difficulties by the use of resilient pickup teeth to minimize bending or breaking, and a resilient base for mounting the teeth by which they can be readily removed and replaced again when required for repairs or for replacement of the teeth.

In the drawings, wherein is disclosed a preferred embodiment of the invention,

FIG. 1 shows a perspective view of a tooth mounting attached on a belt and including a tooth assembly engaged in the mounting, shown with the teeth ends and the belt broken away.

FIG. 2 is an end view on a reduced scale of a drum and belt, illustrating attachment of my improved tooth mountings on the belt, shown with the belt and the base mounting and teeth broken away.

FIG. 3 is a side view on a reduced scale of a pair of teeth and a mounting shown in attachment to a fragment of a belt and with the mounting and teeth shown broken away in part.

Having reference to the drawings, my improved mounting for pickup teeth is for attachment on a tooth carrier such as a conveyer belt 1 of a harvester or hay baler pickup, or directly to a drum, such as the drum 2, in a drum type pickup, it being understood that for the belt pickup a pair of such drums would be used, as in the patent to Melroe with the belt trained over them, or a single drum by itself, as in the patent to Russell.

The tooth mounting consists of a semi-circular base 6 attachable on the belt, or drum, by a bolt 7 passing through the belt and base, and with the attaching nut 8 for the bolt preferably outward for convenience in removal of the bolt.

The base 6 is preferably of resilient material, rubber being suitable, and having a diameter of about one and a half inches and a length of two inches. The base is formed with a slot 9, semi-circular in cross section, extending lengthwise of the base on its under side, and with radial slots 10, 11 and 12, likewise semi-circular in cross section, projecting from the base slot 9.

The base slot 9 and the radial slots 10, 11 and 12 are adapted to mount therein a pair of resilient teeth 14 and 15, preferably of nylon, that are formed integral with a connecting portion 16 in relation to which the teeth extend at right angles and parallel, forming a U-shaped assembly. In mounting the teeth assembly in the base the connecting portion 16 is seated in the slot 9 of the base and the teeth engaged in radial slots 10, 11 or 12, it being understood such radial slots would align with corresponding slots at the other end of the base.

In the use of the device the tooth assembly is mounted with its connecting portion 16 set in the slot 9 of the base, and with its teeth 14 and 15 in aligned slots 10, 11 or 12, and the base and tooth assembly is then attached by the bolt 7 to the belt or drum. The teeth can be set in any of the three sets of slots to vary the angle of the teeth in relation to the drum or belt. This is desirable for better picking up certain kinds of grain and for stripping off the grain, or hay, from the pickup.

Having thus particularly described my invention what I claim is:

1. A mounting for attachment of a pair of teeth on a grain pickup tooth carrier, said teeth having a straight connecting portion from which the teeth project at right angles in a common plane, said mounting comprising a semi-circular base having a slotted under side in which the connected portion of the teeth is engageable and a slot at each end extending radially of the under side slot and in which the teeth are engageable, and means for attachment of the base on the carrier.

2. A mounting as set out in claim 1 in which two or more radial slots are provided in each of the ends of the base with the slots at one end aligned with slots at the other end and by which the teeth can be set at different angles on and to the tooth carrier on which the base is mounted.

References Cited in the file of this patent
UNITED STATES PATENTS

| | | |
|---|---|---|
| 2,351,144 | Oehler | June 13, 1944 |
| 2,790,538 | Collins et al. | Apr. 30, 1957 |